(No Model.)
H. ENDEMANN.
PROCESS OF MAKING FERTILIZERS.
No. 404,348. Patented May 28, 1889.
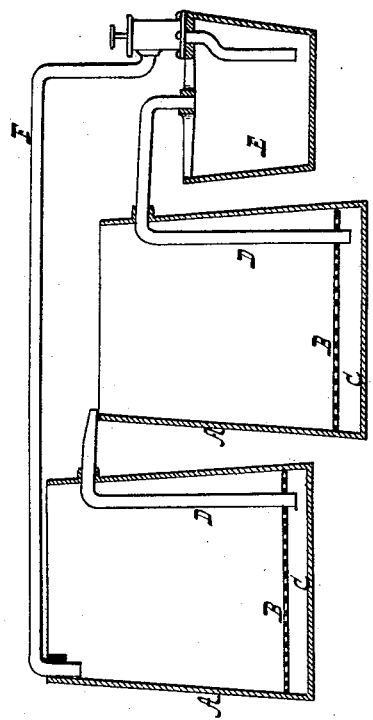
WITNESSES:
INVENTOR:
Hermann Endemann.
BY
ATTORNEYS,

UNITED STATES PATENT OFFICE.

HERMANN ENDEMANN, OF BROOKLYN, ASSIGNOR TO LEOPOLD WALLACH, OF NEW YORK, N. Y.

PROCESS OF MAKING FERTILIZERS.

SPECIFICATION forming part of Letters Patent No. 404,348, dated May 28, 1889.

Application filed September 22, 1888. Serial No. 286,109. (No specimens.)

*To all whom it may concern:*

Be it known that I, HERMANN ENDEMANN, a citizen of the United States, residing of Brooklyn, in the county of Kings and State of New York, have invented new and useful Improvements in the Manufacture of Fertilizers, of which the following is a specification.

This invention relates to fertilizers for agricultural purposes; and it consists in a process for producing such fertilizers from the tobacco-plant, as hereinafter described, the product or tobacco extract produced being claimed in my application filed April 5, 1888, Serial No. 269,663, allowed July 7, 1888.

In the accompanying drawing the figure is a vertical sectional elevation of an apparatus suitable for carrying the process into effect.

In carrying out the invention I use chiefly the stems and waste portions of the tobacco-plant, which are laid aside or rejected in various manufactures of tobacco; but the whole plant can be made use of in the same manner. I take about ten tons of tobacco stems and waste, and after moistening the same with water I cut it into lengths of an inch, more or less. It is then crushed by any suitable means—as, for example, by passing it between crushing-rollers. By moistening the tobacco before it is crushed I prevent it from becoming finely broken up and crumbled by the crushing operation, as would be the case if it were crushed while dry. The moistened condition of the tobacco also enables the crushing operation to be the more effective in breaking or disintegrating the body or structure of the stems and waste, so that their fibers will be exposed to and be the more thoroughly acted upon by the acid in the subsequent operation; but the moist crushing of the tobacco may be omitted and the tobacco subjected to the action of the acid without moistening and crushing where saving of time in the extraction of the product is of no great importance, and the tobacco may be crushed or ground dry if the preservation of the fiber is not desired. The crushed tobacco is next immersed in a boiling hot-water solution of a mineral acid, by preference concentrated sulphuric acid, known in commerce as "oil of vitriol," in a leaching-tank, A, of any suitable construction, (see the accompanying drawing,) having a false perforated bottom, B, and below the false bottom a chamber, C, with a discharge-pipe, D, leading upward therefrom and going out through the side of the tank at a point about a foot below the top of the tank, for tanks of about from ten to fourteen feet in height. The liquid in the tank is kept at such a height above the place where the discharge-pipe leaves the tank as to secure a flow of the extract through the pipe.

I use in making the acid solution about from two hundred to one thousand pounds of oil of vitriol to about ten tons of dry tobacco stems and waste, according to the quality or condition of the tobacco and to the ultimate composition of the product sought to be obtained—that is to say, if I use as basic material in subsequent steps of my process a basic phosphate it is evident that a larger proportion of sulphuric acid will tend to a larger production of acid phosphates in the product, and I also add enough water to steep the tobacco—say from about twenty to forty tons of water to ten tons of tobacco weighed when dry. The tobacco is subjected to the action of the boiling acid solution until its soluble portions are dissolved out by the acid, which can be ascertained by examining some of the tobacco-stems, which, after stirring and slight disintegration in pure water, must show a pretty uniform but lighter color than the natural color if the action of the acid is to be considered as finished. A few hours' digestion will suffice to produce this result. Hot water is then allowed to flow into the top of the tank, and thereby the heavy solution or extract obtained from the tobacco is forced downward through the false bottom into the chamber below it, and thence upward through the discharge-pipe.

The extract obtained by leaching the tobacco with the acid solution contains the portions of the tobacco which are soluble in said acid solution. This extract may be directly used as a fertilizer; but if it is necessary to transport it a considerable distance, whereby the expense of transportation may become an item of importance, the amount of water should be limited as much as possible. In order to do this, I take so much of the liquid extract discharged from the discharge-pipe as will be equal to the quantity of liquid necessary for the maceration of another mass of ten tons of dry tobacco stems and waste, and re-enforce the acid strength by the addition of oil of vitriol, heat it, and use it for the treatment of such other mass of ten tons of tobacco in a like tank. This may be repeated by the use of additional similar tanks connected with those already mentioned, each tank standing sufficiently lower than the preceding one to insure discharge from one to the other, while the extract from the lowest one or from the final receptacle, E, may be conveyed back to the highest one by means of a pump and suitable pipe, F, to be again passed through the tanks, thereby enriching the extract with the soluble portions of the tobacco. The drawing shows two such leading tanks arranged at different elevations, as above mentioned.

The boiling of the acid solution in the tanks may be accomplished by introducing steam into the liquor in any usual manner.

Care is taken whenever the fibrous residuum of the tobacco is to be put to further uses—as, for instance, the manufacture of paper therefrom—that the concentration of the liquor by these means is not carried to such an extent that the leaching will fail to remove from the tobacco-fibers those substances which it is desired to dissolve out of the tobacco by means of the acid solution.

When it is not desired to put the fibrous residuum to further use, the concentration of the liquor can be carried further without thereby departing from my invention, and a considerably larger proportion of oil of vitriol or acid than that above given may then be employed. If further concentration is required, this is obtained by evaporation.

In order to retain during concentration by evaporation to dryness the free volatile acids, especially the nitric acid, it is necessary to add to the extract a substance of basic character. For this purpose I add thereto, by preference, a quantity of ground bones or other basic phosphates equal to about five per cent., by weight, of the tobacco (when dry) used in the operation, the exact quantity depending upon the quantity of sulphuric acid which has been used in its preparation. It is contemplated to use so much basic phosphate as to convert the larger part of it into acid phosphate and leaving a smaller portion in the shape of neutral phosphate. By this treatment the free acid present in the extract, especially nitric acid, which is a constituent of the tobacco, and which in part may volatilize during concentration, is neutralized, and the extract is correspondingly enriched in nitrogen and phosphoric acid. These additions can be made also in case that the extract is to be kept in the liquid state, since the extract contains sufficient acid to convert basic into neutral and acid phosphates.

Where it is not desired to preserve the fiber of the tobacco of any considerable length, the moistening and cutting of the tobacco may be dispensed with and the tobacco may be put through the crushing-machine in a dry state, preparatory to the treatment with the acid solution.

By the above treatment and method I produce from about one hundred pounds of dry tobacco stems and waste about thirty-five to fifty pounds of dry fertilizer or manure, or a correspondingly larger quantity of liquid manure, the quantity of either depending upon the quality of the stems or waste—as, for instance, whether they are rich or poor in soluble material and the quantity of acid and basic material employed.

The manure product is a dark-brown liquid of agreeable odor when the evaporation is not continued to the end, and when the evaporation is continued to dryness the product is a brown mass, which can be reduced to a powder by grinding.

The said product contains large percentages of potash and ammoniacal compounds, nitrates and phosphates, and constitutes a valuable fertilizer, which can be employed for agricultural purposes in the manner liquid manures are usually employed, or in a dry state—as, for instance, in the form of a powder. It can be used alone or mixed with other materials or with other fertilizers or substances that may be needed for any particular soil or for any particular crops.

What I claim as new, and desire to secure by Letters Patent, is—

1. The process for producing a fertilizer from tobacco, which consists in subjecting the tobacco to the action of a solution of mineral acid, washing the tobacco-fiber with water, and adding to the extract produced basic material, substantially as described.

2. The process for producing a fertilizer from tobacco, which consists in moistening the tobacco, crushing the same, subjecting it to the action of mineral acid, washing the tobacco-fiber with water, and adding to the extract produced basic material, substantially as described.

In testimony whereof I have hereunto set my hand and seal in the presence of two subscribing witnesses.

HERMANN ENDEMANN. [L. S.]

Witnesses:
W. C. HAUFF,
E. F. KASTENHUBER.